April 30, 1968 G. P. KNAPP 3,380,637
SHEET GUIDING APPARATUS
Filed Oct. 4, 1965 7 Sheets-Sheet 1

INVENTOR.
GEORGE P. KNAPP
BY
Kenway, Jenney & Hildreth
ATTORNEYS

April 30, 1968 — G. P. KNAPP — 3,380,637
SHEET GUIDING APPARATUS
Filed Oct. 4, 1965 — 7 Sheets-Sheet 2

INVENTOR.
GEORGE P. KNAPP
BY Kenway, Jenney & Hildreth
ATTORNEYS

April 30, 1968
G. P. KNAPP
3,380,637
SHEET GUIDING APPARATUS
Filed Oct. 4, 1965
7 Sheets-Sheet 5
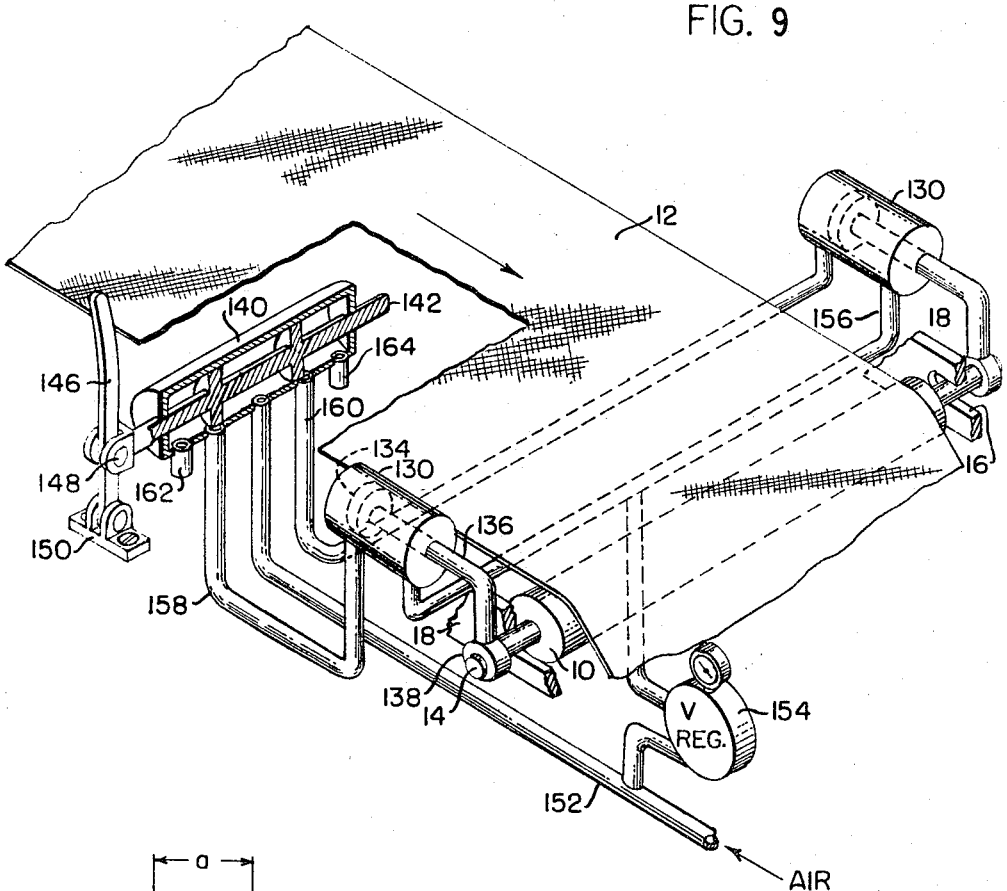
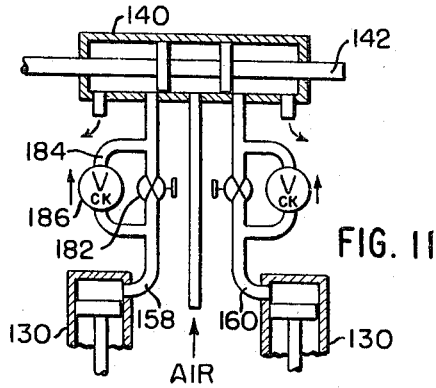
INVENTOR
GEORGE P. KNAPP
BY,
Kenway, Jenney & Hildreth
ATTORNEYS

INVENTOR
GEORGE P. KNAPP

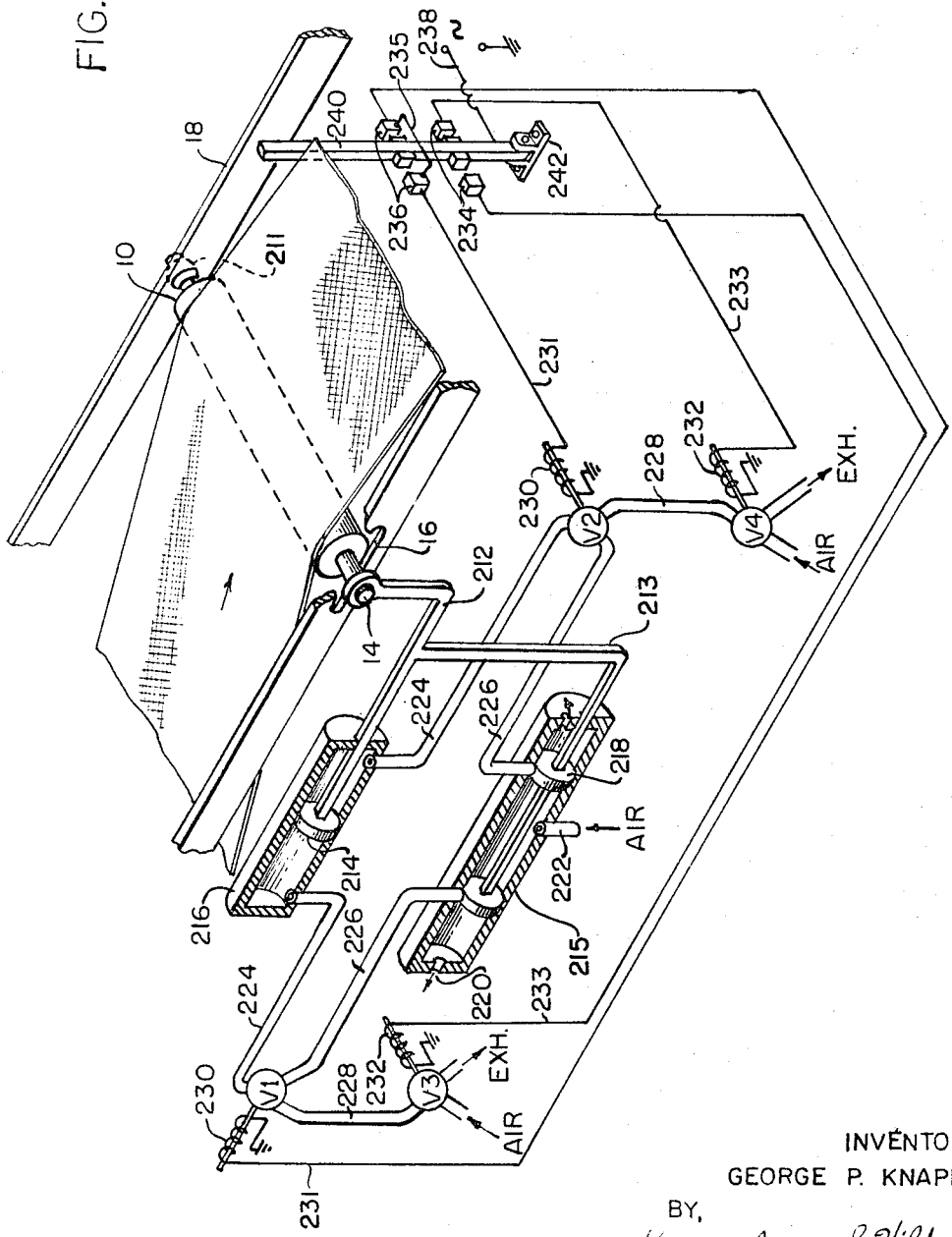

3,380,637
SHEET GUIDING APPARATUS
George P. Knapp, Waban, Mass., assignor to Mount Hope Machinery Company, Taunton, Mass., a corporation of Massachusetts
Continuation-in-part of application Ser. No. 337,779, Jan. 15, 1964. This application Oct. 4, 1965, Ser. No. 496,244
11 Claims. (Cl. 226—20)

ABSTRACT OF THE DISCLOSURE

A sheet guider operating with reduced over-corrective hunting. A guide roll is tilted rapidly to a fixed angle when the guided sheet is displaced from a predetermined path, without reference to the extent of the displacement, and is snapped back to a neutral position as soon as the sheet is restored to its path. In one form the ends of the roll are independently movable by separate actuators, the inactive end remaining stationary. The actuators are preferably double-acting types which apply a uniform driving force both on tilting and restoration to minimize the time delays. A slower rate of roll tilting than of snap return to the neutral position is an optional feature for further reduction of over-correction of small displacements.

Background and summary of the invention

This application is a continuation-in-part of my U.S. patent application Ser. No. 337,779 filed Jan. 15, 1964, now abandoned.

This invention relates to an apparatus useful for guiding moving sheet, web, or strand materials of indefinite lengths including continuous belts, in predetermined paths of movement, and is useful for handling various materials, including textiles, plastic firms, paper, tire cord, and the like.

Conventional guiders employ one or more rolls which are arcuately wrapped by a sheet traveling in a direction transverse to the longitudinal extent of the roll; provision is made to tilt the roll angularly from its normal or neutral position to correct deviation of the sheet from a desired path, by producing a crawling movement along the roll. This corrective crawling movement of the web takes place at a rate which is dependent upon the angle at which the rolls are tilted from the neutral position, transverse to the direction of sheet travel.

The conventional method of control involves detection of the position of an edge of the sheet, and the production of an error signal when a deviation occurs, in either lateral direction, in excess of tolerance limits defining an intermediate dead zone of no detector response. It has also been conventional practice to utilize actuating means which produce tilting movement of the rolls at a very moderate angular velocity. The characteristic mode of cooperation of these conventional detection and actuating means produces a corrective movement which continues to increase the angle of roll tilt so long as the deviation persists; the angle of roll tilt thus reaches a maximum at a time when the deviation has already been eliminated. The roll remains tilted after the edge returns to proper position; and only after an over-correction has been effected, which shifts the edge beyond an opposite tolerance limit, does the roll begin to return toward a normal transverse position. Of course this over-correction causes the roll to tilt in an opposite sense, and so a cycling behavior continues. The delay in attaining the maximum angle of roll tilt implies that any excess tilt beyond that required to correct an error of a given magnitude is undesirable; and in fact, an excessive tilt would produce increased over-correction in the conventional system. But this method necessarily has a hunting characteristic, resulting in undesirably rapid wear of the parts through unnecessarily frequent cycling, as well as a relatively inaccurate guiding action.

A modification of the conventional system provides for a tilting movement whose angular velocity is proportional to the magnitude of the detected error, rather than being of a fixed value. The roll is thereby tilted more slowly in correcting a small error than a large one, but again the roll attains its maximum tilt angle at a time when the correct web position has already been restored. This method alleviates to some extent the tendency of the system to over-correct, but by no means eliminates the difficulty, and further entails much more complex, and consequently more expensive, controls.

It is the primary object of this invention to provide an improved sheet guiding apparatus which affords improved guiding accuracy, and which reduces the tendency to over-corect sheet position errors. Further objects and advantages of the invention will become apparent as the following description proceeds.

In realizing these objects, I utilize a guiding method in which deviation of the sheet edge beyond predetermined tolerance limits is detected without reference to the magnitude of the deviation beyond these limits; and a guide roll is moved to a predetermined tilted position of a fixed angle, in advance of the arrival at the detection zone of any sheet region which may exhibit a still larger deviation. The roll is held in the predetermined tilted position so long as the deviation continues to exceed the tolerance limit; and is immediately returned with a snap action to a neutral position when the excess deviation disappears.

Since the rate of corrective movement of the sheet is proportional to the angle of tilt of the guide roll, correction at a relatively high and fixed rate is thus instituted at once, even though it has not yet been determined whether the sheet deviation may be large or small. The roll tilt is always of the same magnitude, subject to adjustment if desired; and depends not on the extent of a sheet deviation, but only on this deviation having exceeded the response threshold of the detection means. The corrective movement takes place at a uniform rate regardless of the magnitude of the deviation, the only variable ordinarily appearing in the process being the duration of the corrective roll displacement. It is contemplated that the magnitude of the fixed angles of guide roll tilt may be adjusted to a maximum consonant with the ability of a given material to withstand rapid crawling, but these angles will ordinarily be held constant for any given application.

According to an alternative mode of operation, the rate of tilting of the guide roll from the neutral position is somewhat slower than the rate of return. A sufficiently large tilt angle must be provided to correct the largest and most rapidly changing errors in web position; however, large errors are relatively infrequent, and the majority of deviations are of small magnitude, and change at a slower rate. Some "overshoot" and over-correction of small errors may result if the maximum tilt angle is assumed when a minor error occurs, because of the finite time required for roll displacement. By reducing the rate of tilting of the roll from the neutral position, this over-corrective tendency is overcome. If the error is large and persists, the roll reaches its maximum tilt angle after a slight delay. In this way, the occasional extreme errors are corrected largely in accordance with the previously described procedure, while over-correction of frequent small errors is minimized.

In improved automatic guider apparatus according to a preferred embodiment of the invention, at least one guide roll is mounted for freedom of movement between a neutral position normal to the direction of sheet travel, and two tilted positions of opposite but equal angularity. The roll axle is received at its opposite ends in guide means each affording freedom of movement of one end of the roll between two terminal positions. Either end of the roll may thus be moved individually and freely between a neutral position and a corrective position of one angular sense. Separate actuating means are provided for each end of the roll, and these are adapted to move the roll with a rapid snap action between its alternate positions. These means may comprise electrical solenoids, hydraulic or pneumatic motors, or the like. I generally prefer that the same actuating means be used to return the roll to the neutral position, since the return movement should be as rapid as possible. However, spring means may be used for restoring the neutral position where the equipment has low inertia and can be shifted rapidly by such means. Spring-return actuators are therefore limited to guiders of small sizes; in larger sizes, the required stroke of the actuating means and the actuating force are correspondingly large, e.g., 6 inches and 100 pounds, respectively. The actuating force for a large guider calls for springs whose force would vary so greatly over the necessary length of stroke that performance would be seriously affected. The employment of fluid pressure or electrical power for both displacement and restoration of the guide roll relative to the neutral position, gives full actuating force throughout the stroke so that the roll may be restored to neutral in a minimum interval, with a corresponding reduction in over-corrective tendency.

According to a modification, the initial rate of tilting of the guide roll from the neutral position is limited to a lesser value than the rate of return, e.g., by restricting the rate of flow of pressure fluid into pneumatic actuating means, in order to prevent the roll from attaining its limiting angle of tilt in response to the frequently-occurring small deviations of the sheet from its path. Since a small error is quickly corrected, the roll may not reach its fully-tilted position before being returned to neutral. However, if an error is of substantial magnitude and persists, the roll continues to tilt, attaining its limiting tilted position after a short interval. Provision is made to maintain a maximum rate of flow of pressure fluid to the actuator on the return stroke, so that the roll will be restored to neutral as promptly as possible upon disappearance of the edge deviation, thereby restricting any over-corrective tendency to a minimum. To this end, a flow restriction in the fluid supply line to the actuator may be by-passed by a check valve for exhaust and return movement, or various other arrangements may be employed, as will readily occur to those skilled in the art.

Control of the apparatus may be carried out by any conventional detection means capable of sensing a deviation of the sheet beyond tolerance limits in either lateral direction, but these means need not be capable of detecting the magnitude of the deviation in excess of these limits.

While the specification concludes with claims distinctly pointing out the subject matter which I regard as my invention, it is believed that a clearer understanding may be gained from the following detailed description of preferred embodiments thereof, referring to the accompanying drawings, in which:

FIG. 9 is a fragmentary view in perspective of a modified construction, suitable for guiders of larger sizes, which utilizes double-acting actuating means;

FIG. 10 is a fragmentary sectional view showing a modified form of spool control valve, providing for the adjustment of tolerance limits, for use in the apparatus of FIG. 9;

FIG. 11 is a fragmentary schematic view showing a modification of the control system of FIG. 9, providing different rates of roll tilting to and from the neutral position;

FIG. 13 is a fragmentary view in perspective showing a construction in which the guide roll has a fixed pivot at one end.

Referring to FIGS. 1–4, a first form of the improved guiding apparatus is shown, which is preferably of a small size. The guider includes at least one correcting roll 10, which is arranged normally in a neutral position extending in a direction transverse to the path of movement of an indefinite length of sheet, web, or strand material 12. The sheet is assumed to travel in the direction shown by the arrow in FIG. 4. As in conventional practice, the roll is wrapped arcuately by the web to a sufficient extent to cause the sheet to crawl laterally over the roll surface when the latter is tilted at an angle, either in the plane of the paper as viewed in FIG. 4, or with a component normal thereto. The roll is rotatably mounted on suitable bearings (not shown) upon a stationary axle 14, whose position is shifted to bring about corrective displacements of the roll.

Figure 2:
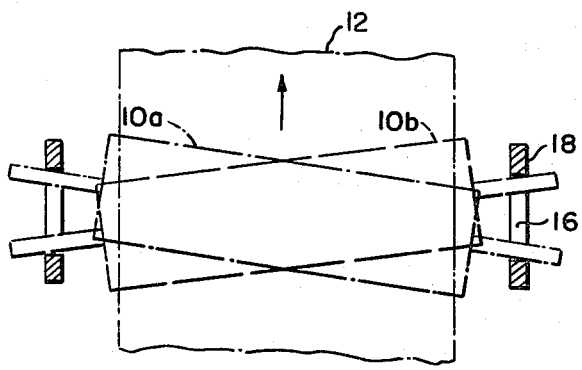
FIG. 2 is a schematic plan view showing the alternate corrective positions of the guide roll of FIG. 1.
Figure 3:
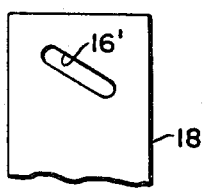
FIG. 3 is a fragmentary view in elevation of a modified form of guide roll support.
Figure 4:
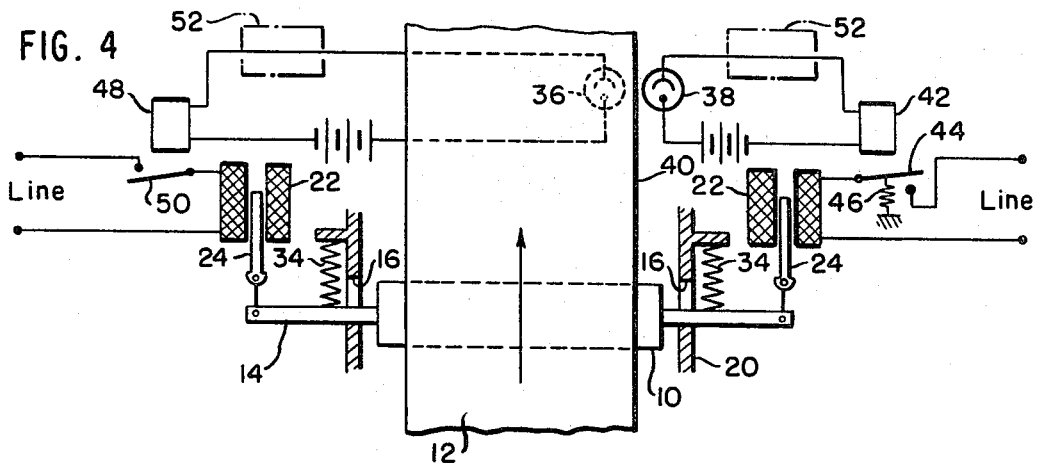
FIG. 4 is a schematic view of the guider of FIG. 1, with one form of detection and control means.

The axle 14 is freely supported in guide slots 16, formed in upstanding members 18 of a supporting frame 20, in such manner as to be slidable in either slot individually. The roll may thus be moved from a neutral position in which its axis is substantially perpendicular to the direction of sheet travel, as shown in FIG. 4, to either of two predetermined titled positions of equal but opposite angle, as shown in FIG. 2. If it is desired to produce a translation to the right of a sheet which is moving upwardly in FIG. 2, the roll may be moved to position 10a; or if it is necessary to translate the sheet to the left, the roll may be placed at 10b.

Figure 1:
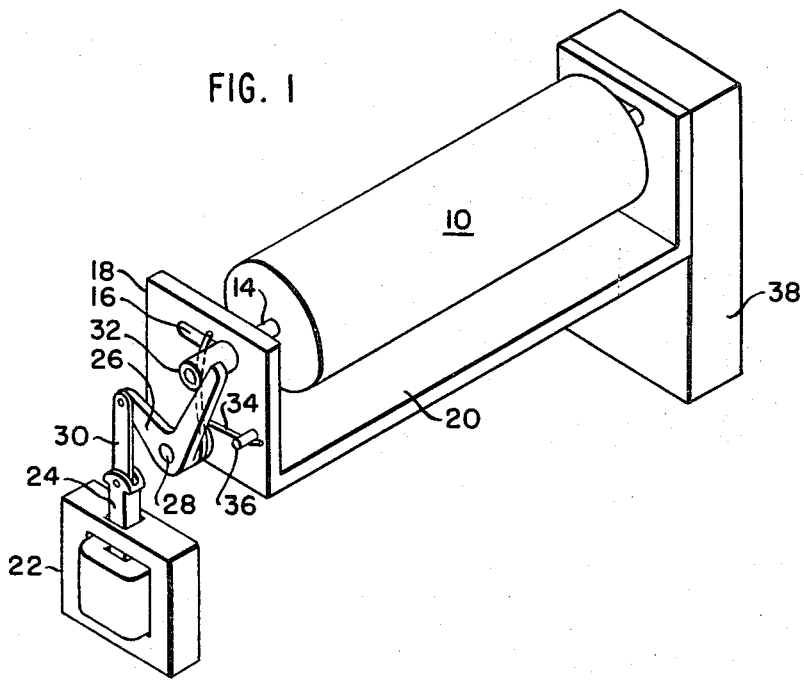
FIG. 1 is a pictorial view of an embodiment of the invention in a guide roll structure of relatively small size.

As shown in FIG. 1, the guide slots 16 are horizontal, and the web is to be wrapped about the roll in such manner that a vertical plane passing through the roll axis will bisect the wrap angle formed between the paths of approach and departure of the sheet with respect to the roll. An angular displacement of the roll in the horizontal plane, or more generally, in a plane perpendicular to that plane which bisects the wrap angle, will produce a reaction in the web which causes it to crawl longitudinally along the roll and thus bring about a lateral translation.

However, as is well known in the art, the tilting movement of the roll may also have a component in the plane which bisects the wrap angle, or may occur entirely in that bisecting plane, and yet produce the desired translation. Even so, a tilt in this direction will ordinarily also bring about a difference in the path lengths of the various longitudinal elements of the sheet passing between the guide roll and adjacent rolls. In the case of stretchable materials, this may cause some differential stretching and distortion to take place; and fragile webs may be torn, or else partially disengaged from the guide roll. The applications for which such movements are suitable are therefore somewhat limited. However, they do fall within the contemplation of the invention, and an inclined guide slot illustrated at 16′ in FIG. 3 may be used where desired, as may be a vertical guide slot.

Actuating means for shifting the ends of the roll individually in the slots 16 comprise a pair of snap-acting solenoids 22, whose armatures 24 are linked with the opposite ends of the shaft 14 to drive them individually in corrective directions upon energization. A preferred form of linkage for each end of the shaft includes a bell crank 26, pivotally mounted at 28 in the support 20. One of the arms of the bell-crank is connected by a pivoted link 30 to the armature 24, and the other drives a roller 32 mounted on the end of the roll axle.

To return the roll to the normal transverse position when the solenoids are de-energized, compression springs 34 are interposed between the axle and the support 20. As shown in FIG. 1, each of these may comprise a coiled wire spring engaged between a roller 32 and a stop pin 36 affixed to the adjacent support. As shown at the right end of the assembly in FIG. 1, the actuating means associated with either end of the roll are encased in a housing 38, only one housing being shown in the drawing.

The guider also includes detection means shown in FIG. 4 for controlling the displacements of the roll in a manner to maintain a guided edge of the travelling sheet within predetermined tolerance limits of lateral displacement in either direction from a nominal position. These means include a pair of electric eye units 36, 38, of conventional type, of which the first is normally shaded by the web and therefore non-conducting, while the second is normally exposed to a suitable light source (not shown) by the guided selvage 40 of the sheet 12 when it occupies the normal position shown. In this normal relationship, the conducting unit 38 energizes a coil 42 of a normally-closed relay 44, to maintain its contacts open against the bias of a spring 46, and thus de-energize the solenoid 22 associated with the right-hand end of the roll. The normally non-conducting unit 36, on the other hand, maintains the coil 48 of a normally-open relay 50 in a de-energized condition, so that the solenoid 22 associated with the lefthand end of the roll is also de-energized. The roll is held in the normal position shown, by the springs 34.

Now, if it is assumed that the sheet exhibits a tendency to travel to the left as viewed in FIG. 4, so far that the electric eye unit 36 becomes exposed to the light source and begins to conduct, the resulting energization of the coil 48 closes the relay contacts 50, and thus energizes the left-hand solenoid 22 to drive the roll immediately to the tilted position 10a of FIG. 2. Of course the unit 38 continues to conduct, and the right-hand solenoid 22 remains de-energized. The resulting tilt will cause the sheet to translate to the right in FIG. 4, returning toward its normal position. However, immediately the unit 36 is covered and ceases to conduct, the coil 48 is de-energized as is the left-hand solenoid 22, so that the compression spring 34 instantly returns the roll to the neutral position shown in FIG. 4.

Now if it is assumed that the sheet exhibits a tendency to wander to the right, the newly-shaded unit 38 ceases to conduct, and the coil 42 permits the relay 44 to close, thereby energizing the right-hand solenoid 22 and causing an immediate tilting movement of the roll to the position 10b of FIG. 2. This displacement correspondingly produces a lateral shift of the sheet to the left, once again returning it to the proper path, and the roll is then allowed to return once again to the neutral position.

It will be understood that no attempt is made to maintain the selvage 40 in the identical path of travel, but that it is allowed to wander laterally within a dead zone defined between tolerance limits, which are physically determined by the lateral spacing of the electric eye units 36 and 38. These limits may be easily adjusted to suit the requirements of a given application, simply by placing these units appropriately.

It may also be desirable to institute a time delay between the reversal of the conducting or non-conducting condition of either electric eye unit and the resulting roll movement, in order to avoid any corrective movement when there is merely an edge waviness of brief length, or a discontinuity such as a tear in the selvage of the web. These means may be of a conventional type and are indicated only schematically at 52 in FIG. 4.

It will be understood that a single photo-cell may be used as a detector, in which case a balanced-armature relay would replace the two relays 36 and 38. Adjustment of the width of the dead zone would be made optically by adjusting the spacing of the light source and photo-cell from the web so as to alter the width of the light beam at the plane of the sheet.

Figure 5:
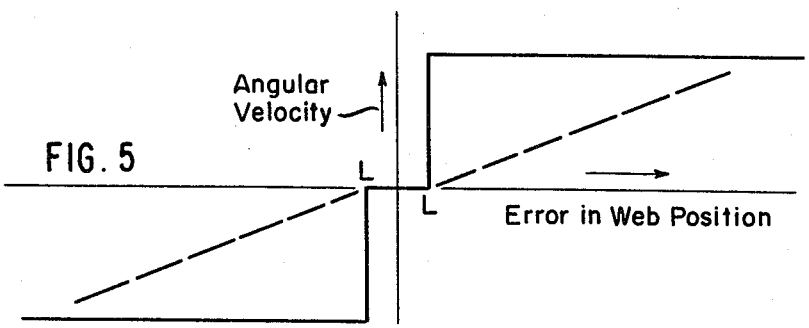
FIG. 5 is a graphic illustration of the control characteristics of conventional methods of guider control.
Figure 6:
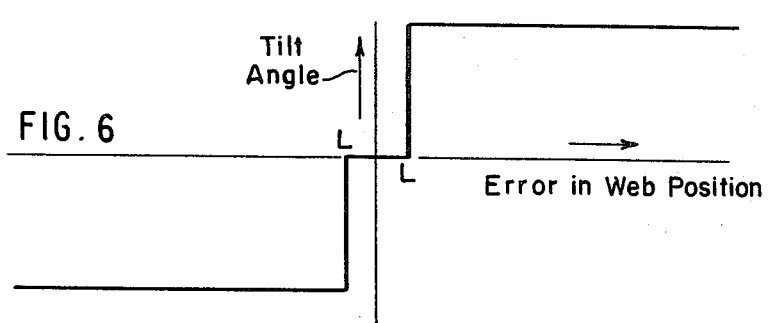
FIG. 6 is a graphic illustration of the control characteristics of one form of the improved guider.
Figure 7:
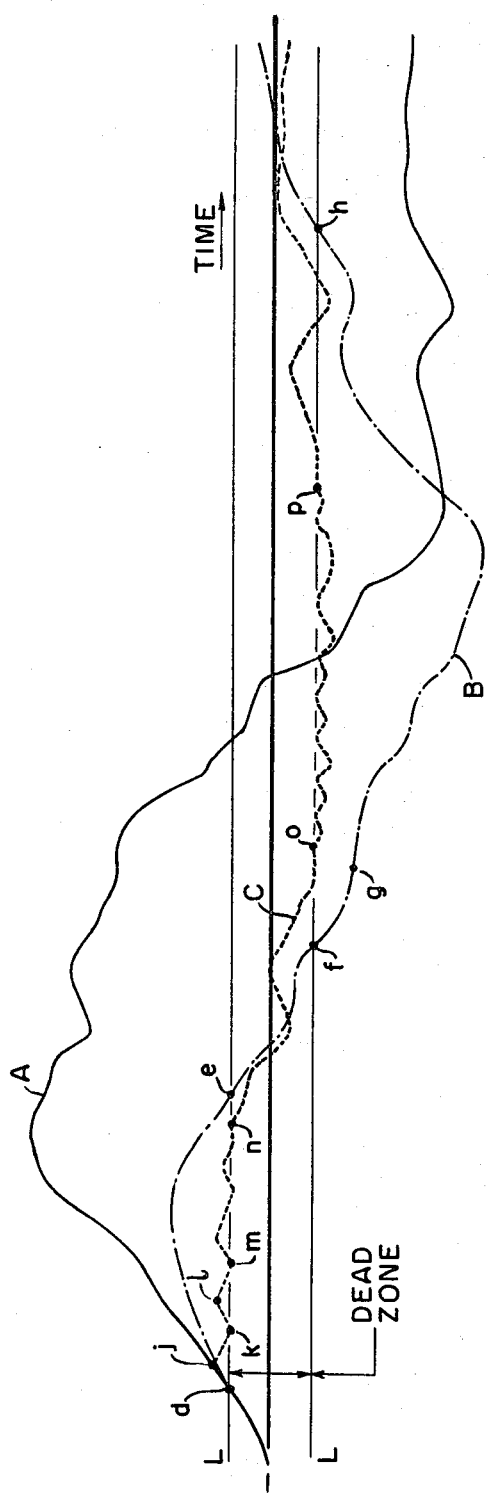
FIG. 7 is a graphic illustration comparing the sheet-position correction characteristics of the improved guider and conventional guiders, in relation to a typical path which might be followed by an unguided sheet.

For a further understanding of the control characteristics of this apparatus and of its mode of operation, some of these characteristics are graphically compared in FIGS. 5–7 with those of systems which have been defined herein as conventional for purposes of description. In FIG. 5, the principal characteristic of roll motion with respect to selvage displacement is shown in solid line for one type of conventional system, and in dashed line for another conventional system, the proportional type. In either case, it is the primary characteristic that the roll is changing its tilt angle continuously, so long as an error persists which is in excess of the tolerance limits L—L.

In the simplest conventional method of control, a uniform angular velocity is imparted to the roll regardless of the magnitude of the error, and persists in the same angular sense so long as the error remains. Thus, the angular displacement continues to increase even after the maximum excursion of the edge has passed and the web has begun to return to the normal position; the roll does not cease its angular movement until after the error has decreased to less than the tolerance limit. Further, the roll remains tilted at the maximum angle even when the edge is inside the tolerance limit, and so continues shifting the sheet toward the opposite extreme. The control system is not responsive in the dead zone, and therefore the edge must pass the opposite tolerance limit before any action is taken to return the roll toward neutral position.

The proportional control system has the characteristic that the angular velocity imparted to the roll is proportional to the magnitude of the excursion of the selvage beyond the tolerance limits. Again, however, the angular displacement continues at a maximum even after the error has been eliminated.

In FIG. 6, the principal characteristic of the improved apparatus is shown, which is that a fixed maximum tilt angle is promptly introduced when an error in excess of tolerance limits occurs, without reference to the magnitude of the error; and that the tilt angle immediately returns to zero when the error is corrected within the tolerance limits. The angular velocity of the tilting movement is large, and the movement terminates after a brief interval in a fixed angle of tilt. The roll then remains in this fixed position, during which time the error will continually decrease; and immediately upon the return of the guided edge within the tolerance limits L—L, the roll is returned with a maximum angular velocity to the neutral position. The roll therefore does not remain tilted for any appreciable time interval subsequent to the actual correction of the deviation, and does not produce substantial over-correction.

In alternative embodiments of the invention described hereinafter, the rate of tilting movement of the roll from the neutral position is intentionally reduced somewhat, to avoid over-correction of small errors, while the rate of return to neutral continues to be extremely rapid. The rate of change of tilt angle during the tilting movement would then be less rapid than in FIG. 6, but the rate of restoring to neutral would remain the same.

A generalized comparison of sheet-guiding actions is shown in FIG. 7, in which curve A represents a typical deviation of a sheet which is not being guided. Offset against the tendency of the sheet to wander laterally as in curve A, the edge position resulting from the action of a conventional proportional-velocity system is shown by curve B, and that produced by a typical example of the improved apparatus is shown in curve C. It is assumed in each case that the selvage is initially spaced at the center of the dead zone between tolerance limits L—L, and commences to wander first in one lateral direction, then the other.

The conventional guider starts to respond at point $d$ when the error first exceeds the tolerance limit. The slope of its response curve immediately starts to diverge from that of the unguided web as the roll starts to tilt. The divergence of slope continues to increase until the error re-enters the dead zone at point $e$. Within the dead zone, the roll remains fixed at a maximum angle of tilt, and consequently a severe overshoot occurs, starting at point $f$. Beyond $f$, the divergence in slope starts to decrease, and at $g$, where curve B is essentially parallel with curve A, the roll has reached its neutral position. However, since a large error exists, the roll continues to tilt rapidly toward the opposite corrective position. This eventually brings the edge back within the dead zone at point $h$.

The improved guider also starts to respond at $d$, and due to the rapid motion of the roll, applies correction at a maximum rate at point $j$, which rapidly brings the error back within the dead zone at $k$. At this point the roll returns to neutral position until $l$ is reached, whereupon the roll again tilts, correcting the error at point $m$, after which the corrective cycle repeats until point $n$ is reached. From $n$ to $o$, no guiding action occurs, since the edge is within the dead zone. From point $o$ to point $p$, another series of corrective motions of the roll occurs, this time in the opposite lateral direction.

The characteristic of my improved apparatus is relatively free from the tendency to over-correct, because an approaching error is anticipated by shifting the roll rapidly to a fixed corrective tilt angle, and returning it immediately to the neutral position when the sheet edge has been returned once more to a path within the tolerance limits.

In use with very delicate materials, I prefer to employ a roll (not shown) having a series of independently rotatable sections spaced along the axle, so that each section may assume a rotational velocity in keeping with its rapid angular movement relative to the local portion of the sheet. This expedient permits use of a tilt angle affording a high rate of correction with delicate materials.

The fixed angle of tilt of the guide roll may be selected of a maximum value consonant with the ability of a given material to withstand rapid crawling movement without injury. However, a lesser angle would reduce the cycling frequency, with some increase in the duration of error.

Figure 8:
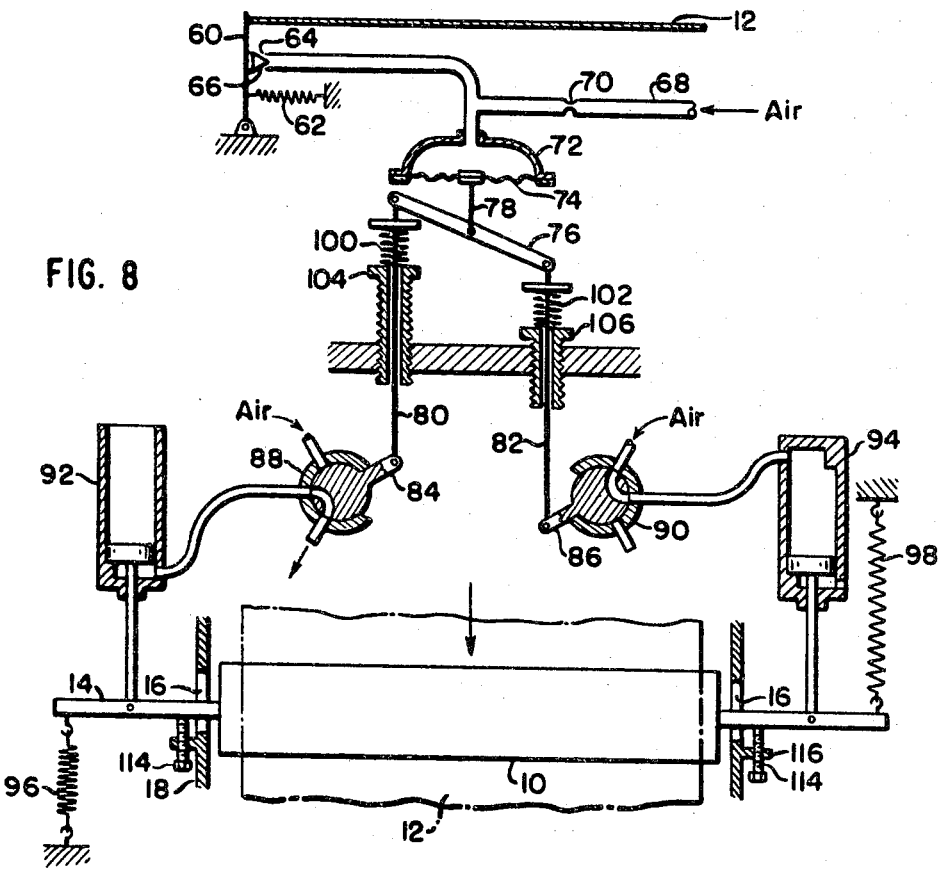
FIG. 8 is a schematic view of another form of guider of small size, including control apparatus.

Referring now to FIG. 8, an alternative embodiment is shown which is adapted once again for the smaller-sized guiders, and in which pneumatic sensing and control means are employed. The position of an edge of the sheet 12 is in this case detected by a pivoted finger 60, biased lightly by a tension spring 62, to control the escape of air pressure through an orifice 64 by means of a valve element 66 affixed to the finger.

Compressed air is supplied to the pressure release valve thus formed by a supply conduit 68, through a fixed orifice 70, thereby to control the pressure in an expansible chamber device 72 according to the position of the sheet 12. The expansible chamber device includes a flexible diaphragm 74 whose position, being determined by the pressure obtaining within, is a function of the sheet position. It will be understood that a displacement of the sheet to the left as viewed in FIG. 8 will open the pressure release valve further, and result in an upward displacement in the diaphragm 74, while a displacement to the right will correspondingly reduce the area of the pressure release orifice and displace the diaphragm 74 downwardly.

In order to translate the control movements of the diaphragm into independent motions of the opposite ends of the roll axle 14 to be instituted at different pressure limits, the control motion is split by means of a balanced link 76, which is pivotally connected at its center by means of a rod 78 to the diaphragm. At its opposite ends, the link 76 is connected to valve control rods 80 and 82, which are pivoted to the valve cores 84 and 86 of a pair of similar three-way control valves 88 and 90, respectively.

The valve cores may be rotated to alternate positions for admitting compressed air to, or for exhausting, pneumatic motors 92 and 94. In the normal position of the sheet shown, the valve 88 is set to exhaust the actuator 92, and the left-hand end of the roll axle is held in normal position by a tension spring 96. On the other hand, the valve 90 is set to energize the actuator 94, holding the right-hand end of the axle in normal position against the bias of a tension spring 98. In this neutral position, downward force is exerted by rod 78 equally on rods 80 and 82. However, the arms 84 and 86 are against their upper and lower stops, respectively; thus the spring 102 is compressed with less force than the spring 100. Although preloaded, the springs 100 and 102 and diaphragm 74 must have a low spring rate, so that valves 88 and 90 will be moved from one position to the other with negligible pressure changes. The preloading of the springs is achieved by engaging their lower ends with adjustable stops 104 and 106, respectively, which are threadedly engaged in the support means.

Now if it is assumed that the web shows a tendency to move to the right in FIG. 8, the pressure on the diaphragm 74 will increase to drive the control rod 80 downwardly, the link 76 pivoting about the upper end of rod 82 as a fulcrum. At a predetermined pressure corresponding to a tolerance limit, and determined by the setting of the stop 104, the core 84 will shift from its upper to its lower stop, admitting compressed air to the actuator 92, and immediately tilt the roll in a corrective direction, clockwise as seen in FIG. 8. The consequent return of the sheet within the tolerance limit relaxes the diaphragm force and allows the spring 100 to raise the core 84 to its upper stop, exhausting the actuator 92, and the spring 96 returns the roll immediately to a neutral position.

In the eventuality that the sheet tends to wander to the left, on the other hand, the pressure acting on the diaphragm 74 will be reduced, consequently pivoting the lever 76 counter-clockwise to relieve the compression of the spring 102. The core 84 acts as a fulcrum, being held in fixed position by the spring 100. As the displacement exceeds the tolerance limit, the pressure change causes the valve core 86 to be shifted to exhaust the actuator 94, and permit the spring 98 to shift the roll suddenly to a corrective tilted position. The consequent return of the sheet edge to the dead zone increases the control pressure sufficiently to drive the rod 82 downwardly to re-energize the actuator 94, and this returns the roll immediately to a neutral position. The link 76 pivots clockwise to bring about this movement, re-compressing the spring 102 and acting upon the relatively compressed spring 100 as a fulcrum. The movement restores the system to equilibrium in the position shown in FIG. 8.

The tolerance limits may be adjusted by resetting the stops 104 and 106 to alter the compressions of the springs 100 and 102, and thereby vary the level of control pressures necessary to bring about movement of the control valves 88 and 90.

The values of the fixed angles of tilt of the roll in its corrective positions may be adjusted to permit the selection of the maximum angle, and correspondingly the maximum correction rate, which is consistent with the ability of the particular sheet material to tolerate rapid crawling movement over the roll. This adjustment is provided for by stop abutment screws 114, threaded in suitable flanges 116 of the support structure 18, so as to define the terminal tilted positions of the roll. Further, these stop abutment means may be independently adjusted to cause the roll to have something other than a truly perpendicular relation to the direction of sheet travel in its neutral position; for if there is an inherent lateral bias applied to the sheet by misalignment of other elements of the handling equipment, as is often the case, this bias can be offset by giving the roll a slight corrective tilt in its neutral position.

The embodiments which have been described utilize spring means for returning the guide roll to the neutral position. However, in guiders of larger sizes, the required length of the return stroke and the actuating forces involved will not permit the use of a spring return, since the restoring force of a spring varies in proportion of the displacement, and the return movement would be unduly delayed. The embodiments illustrated in FIGS. 9–13 utilize double-acting motors to apply uniform restoring as well as displacing forces to the guide roll, thus assuring a minimum time lag in the return movement and the least over-correction.

In FIG. 9, a system is shown in which the actuating rods 136 of pneumatic double-acting motors 130 terminate in eyes 138 for driving connection with the opposite ends of the axle 14. These motors are under the control of a spool valve 140, whose double spool 142 is connected by a pivot 148 to a finger 146; the latter is pivotally mounted on a fixed pad 150 for detecting the position of an edge of the traveling sheet 12. To clarify the drawing, the finger 146 is shown in a position upstream of the roll 10; however, it is preferred to place the detector downstream, so that the effect of the guiding action is fed back to the detector and a closed loop system of control is provided. In the neutral position shown, the spool 142 exhausts each of the motors 130 through conduits 158 or 160 and exhaust ports 162 or 164. Compressed air is supplied through a branched conduit 152 to the spool valve and also to a pressure regulator 154; the latter is set to supply air at one-half the supply pressure to each of the motors 130 through a branched conduit 156. The air so supplied urges the pistons 134 in a direction to hold the guide roll 10 in the neutral position shown.

In the event that the sheet changes its lateral position sufficiently to shift the spool 142 so as to communicate either of the conduits 158 or 160 with the air supply conduit 152, the full supply pressure is applied to the piston 134 of the corresponding motor 130, in opposition to the half-pressure applied to the opposite face of the piston. The motor which is so supplied then drives the connected end of the roll 10 to a tilted position for correcting the sheet deviation. Return of the sheet to its original path re-establishes the neutral relationship illustrated, by reconnecting the actuated motor to exhaust.

In FIG. 10, a modification of the spool valve 140 is shown, in which provision is made for adjusting the tolerance limits within which deviation of the sheet edge is permitted without guider response. The length of the dead zone between the tolerance limits is determined by the difference between the spacing *b* between the conduits 158 and 160, and the spacing *a* between the spool elements 178. The spool is formed in two segments 168 and 170, one of them incorporating a threaded male stud 174, and the other having a threaded female socket 172 so that the spacing *a* may be adjusted. A set screw 176 is provided to secure the parts in adjusted relation.

In FIG. 11, a modification of the control system of FIG. 9 is shown which delays tilting movement of the guide roll from the neutral position without reducing the rate of restoration. Adjustable restrictions 182, comprising needle valves, are interposed in the conduits 158 and 160 to limit the rate of pressurized fluid flow from the valve 140 to the motors 130, thus serving to reduce the rate of tilting movement. However, the restrictions are by-passed for return flow to exhaust the motors, by means of branches 184 interposed in the conduits 158 and 160, and each having a one-way check valve 186.

The control system in FIG. 11 provides a rate of tilting movement which is slower than the rate of return, so that the maximum angle of tilt is not fully assumed when very small errors arise and disappear rapidly. However, if an error persists over a relatively long interval, indicating that it does have a more substantial magnitude, the roll arrives at the fully tilted position after a brief interval, and the previously-explained advantages of anticipating the extent of errors are largely realized. At the same time, any tendency to over-correct the frequently-occurring small errors is reduced. And since the rate of restoration of the roll to neutral is unaffected, any tendency to over-correct by delaying the return movement is avoided, just as in the preceding embodiment.

Figure 12:
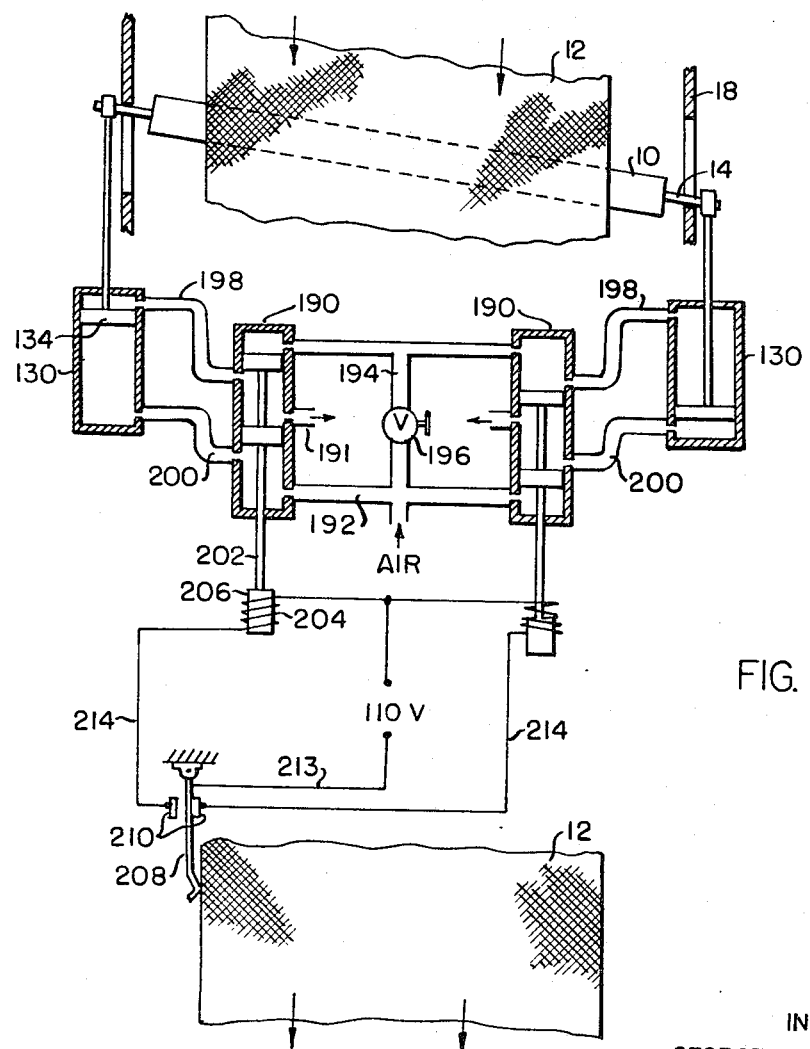
FIG. 12 is a schematic view of another form of guider having rapid-acting solenoid-controlled spool valves.

The system illustrated in FIG. 12 reduces the lag in control response still further in that the spools 202 of control valves 190 are driven by the cores 206 of quick-acting solenoids 204. The solenoids are under the control of a sheet edge sensing finger 208, which serves, upon a shift of the sheet 12 in either lateral direction, to energize an appropriate one of the solenoids 204 through a lead 213, one of a pair of contacts 210, and a corresponding one of leads 214. The tolerance limits are readily adjustable by varying the spacing between the contacts 210.

In this form a control valve 190 is provided for each double-acting actuator 130. When neither solenoid 204 is energized, and both spools 202 are raised, the roll 10 is held in a neutral position by compressed air supplied by a branched conduit 192, through each of the valves 190 and conduits 200, to the motors 130. The upper chamber of each motor 130 then exhausts through a conduit 198 and an exhaust port 191.

In the position of the parts shown in the drawing, the sheet 12 has drifted to the right, energizing the right-hand solenoid, and thus drawing the spool of the corresponding control valve downwardly. Pressure for tilting the right-hand end of the roll is supplied through a restriction 196, comprising an adjustable needle valve, a branched conduit 194, the right-hand spool valve, and a conduit 198, to the upper chamber of the right-hand actuator 130. The lower chamber of the motor is exhausted through the conduit 200 and the right-hand spool valve.

It is to be noted that in this embodiment the rate of pressure fluid supply, for driving the actuators in a direction to tilt the roll, is restricted by the valve 196; therefore the rate of tilting movement of the roll 10 is rather less than the rate of restoring movement to neutral, since the latter is brought about with a full rate of flow of pressure fluid. Essentially the same considerations apply as were previously raised relative to FIG. 11.

A guider is shown in FIG. 13 in which one end of the roll axle 14 is supported in a fixed pivot 211, and the other is free to slide between the neutral position shown, and two limiting tilted positions of opposite sense, in an elongated slot 16 formed in the frame 18. A double-acting actuator 216 has its piston 214 drivingly connected with the free end of the roll axle by means of an arm 212, which bears a leg 213 on which is mounted the double spool 218 of a servo-control valve 215. Compressed air is supplied by a suitable source to the center of the valve 215 through a conduit 222.

The valve 215 maintains control only while the sheet 12 continues in its proper path. If the roll 10 and the piston 214 tend to become displaced from the centralized or neutral position, the corresponding displacement of the spool 218 to right or left admits air through one of a pair of conduits 226 and valves V1 or V2, which are at this time de-energized, to a corresponding one of conduits 224, thus to recentralize the piston 214 and restore the roll to the neutral position. The unpressurized chamber of the motor 216 is exhausted to atmosphere through its associated conduits 224 and 226, de-energized valve V1 or V2, and an exhaust port 220 in a corresponding end of the servo-control valve 215.

In the event of a displacement of the sheet 12 from its normal path, the valves V1 and V2 serve to transfer control of the apparatus from the servo-valve 215 to an appropriate one of solenoid valves V3 or V4, for actuating the motor 216 in a sense to tilt the roll 10 as required to restore the sheet to its proper path. The valves V1, V2, V3 and V4 are all under the control of an edge-position sensing finger 240, pivotally mounted on a fixed pad 242 and supplied from a suitable electric power source by a lead 238. A lateral movement of the sheet edge closes one of each of two pairs of contacts 234 and 236, the latter pair being shorted by a jumper 235. Closure of either contact 236 energizes the coils 230 of both solenoid valves V1 and V2, thus closing communication between the conduits 224 and 226, and opening the conduits 224 to communicating piping 228 for control of the motor 216 by the valves V3 and V4. Depending upon the direction of sheet edge translation, one of the contacts 234 is also closed to energize the coil 232 of a corresponding solenoid valve V3 or V4, opening the corresponding piping 228 to a suitable compressed air supply, and closing its normal connection to exhaust. One chamber of the motor 216 is thus supplied with pressure fluid through one of the sets of valves V1, V3, or V2, V4, while the other chamber is exhausted to atmosphere. The roll 10 is thereby shifted to a terminal tilted position, causing the sheet to translate to its original path; restoration opens the contacts previously closed by the finger 240, and restores control to the servo-valve 215, which immediately re-centers the motor 216 and the roll 10.

While I have illustrated an described preferred embodiments of my invention by way of illustration, it will be understood by those skilled in the art that various changes and modifications may be made therein without departing from the true spirit and scope of the invention, which I therefore intend to define in the appended claims without limitation to the details of the illustrated embodiments.

What I claim is:

1. Sheet guiding apparatus comprising at least one roll arranged to engage a traveling sheet of material transversely to the direction of travel;

control means including edge position sensing means arranged in spaced relation to an edge of the sheet and responsive to lateral deviation in either lateral direction in excess of a predetermined permissable tolerance to produce a control signal indicative of the direction of the deviation;

means supporting each end of said roll for independent displacement to permit limited tilting movement of said roll, from a neutral transverse position with respect to the direction of travel of said sheet, to either of two predetermined tilted positions of opposite angular sense, to induce a tendency in the sheet to correct the lateral position of its path of movement;

a pair of actuating means one drivingly connected with each end of said roll for inducing tilting movement and restoring movement thereof between said neutral position and either of said tilted positions, and each connected with said control means for independent energization thereby in a sense to induce tilting movement, one in response to deviation in each lateral direction, without reference to the magnitude of a signalled deviation;

each of said actuating means being constructed and arranged to tilt said roll to a corrective one of said predetermined tilted positions immediately upon energization by said sensing means and to retain said roll fixed in said one position during the continuance of said deviation, and to return said roll with a snap action immediately to the neutral transverse position upon discontinuance of a signalled deviation.

2. Sheet guiding apparatus as recited in claim 1, in which said actuating means comprise a pair of double-acting motive means constructed and arranged to apply a uniform driving force to said roll throughout the tilting and restoring movements.

3. Sheet guiding apparatus as recited in claim 1, in which each of said actuating means comprises a single-acting motive means constructed and arranged for inducing tilting movement of one end of said roll, and means biasing said one end of said roll toward said neutral position.

4. Sheet guiding apparatus comprising at least one roll arranged to engage a traveling sheet of material transversely to the direction of travel;

control means including sensor means arranged in a fixed position along the path of movement of the traveling sheet and sensitive to any lateral deviation of said sheet from a predetermined path in excess of a predetermined permissable tolerance, for producing a control signal indicative of the sense of the excessive deviation;

means supporting said roll for limited tilting movement from a neutral transverse position with respect to the direction of travel of said sheet to either of two predetermined limiting tilted positions of opposite angular sense to induce a tendency in the sheet to correct the lateral position of its path of movement;

double-acting actuating means drivingly connected with said roll for inducing tilting movement and restoring movement thereof between said neutral position and either of said tilted positions, and connected with said control means for energization by a control signal generated thereby without reference to the magnitude of the signalled deviation;

said actuating means being constructed and arranged to apply a uniform driving force to tilt said roll to one of said tilted positions corresponding to the sense of the excessive deviation immediately upon energization by a control signal, to retain said roll fixed in said one tilted position during the continuance of said signal, and to apply a uniform driving force to return said roll immediately with a snap action to the neutral transverse position upon discontinuance of said signal.

5. Sheet guiding apparatus as recited in claim 4, in which one end of said roll is mounted in a fixed pivot; said double-acting actuating means being drivingly connected with the other end of said roll and movable between a centralized position holding said roll in the neutral position, and two roll-tilting positions of opposite senses; said control means comprising a servo-control valve having a valve element drivingly connected with said actuating means and normally connected for control of said actuating means to maintain said roll in the neutral position, together with by-pass valve means connected for energization by a control signal generated by said sensor means to interrupt connection of said servo-control valve with said actuating means, said by-pass valve means being constructed and arranged upon energization to control said actuating means for tilting said roll to a corrective one of said tilted positions.

6. Sheet guiding apparatus as recited in claim 4, said actuating means comprising double-acting fluid motors each having two opposed expansible chambers; together with pressurized-fluid supply means, and pressure-reducing means connecting said supply means to deliver fluid at reduced pressure continuously to first chambers of each of said motors for biasing each end of said roll toward the neutral position; said control means including a control valve normally connecting second chambers of each of said motors to exhaust, and selectively movable in response to a control signal to admit fluid from said supply at full pressure to the second chamber of either of said motors alternatively, as required to induce a corrective tilting movement.

7. Sheet guiding apparatus as recited in claim 4, in which said actuating means comprise fluid motors; and said control means includes a control valve having a double spool element, pressure-fluid supply means, and a pair of conduit means selectively communicable with said supply means by movement of said double spool element, for supplying pressure fluid to either selected one of said motors; such that said tolerance limit is determined by the difference between the spacing between said conduit means and the spacing between the spools of said double spool element; said spool element being constructed and arranged for adjustment of the spacing between the spools thereof, for adjusting said tolerance limit.

8. Sheet guiding apparatus as recited in claim 4, in which said control means and said actuating means are constructed and arranged to induce tilting movement of said roll at a lesser rate than the restoring movement.

9. Sheet guiding apparatus as recited in claim 4, in which said actuating means comprise fluid motors; and said control means includes control valve means, pressure fluid supply means, and conduit means selectively communicable with said supply means by said control valve means to supply pressure fluid to a selected one of said motors to tilt the connected end of said roll, said conduit means being simultaneously connected by said control valve means to return pressure fluid from the other of said motors to exhaust; said conduit means including flow restriction means for limiting the rate of flow of pressure fluid to said motors, and including unrestricted one-way by-pass return means for an increased rate of return flow.

10. Sheet guiding apparatus comprising at least one roll arranged to engage a traveling sheet of material transversely to the direction of travel;
  detection means comprising edge position sensing means arranged in spaced relation to an edge of the sheet and responsive to lateral deviation in either lateral direction in excess of a predetermined permissable tolerance to produce a control signal indicative of the direction of the deviation;
  means supporting each end of said roll for independent displacement to permit limited tilting movement of said roll, from a normal transverse position with respect to the direction of travel of said sheet, to either of two predetermined limiting positions of opposite angular sense, to induce a tendency in the sheet to correct the lateral position of its path of movement;
  a pair of actuators one drivingly connected with each end of said roll for inducing tilting movement thereof between said normal position and either of said limiting positions, and each connected with said sensing means for independent energization thereby, one in response to deviation in each lateral direction, without reference to the magnitude of a signalled deviation;
  means biasing each end of said roll toward said normal position for returning said roll immediately thereto upon de-energization of said actuators;
  each of said actuators being constructed and arranged to tilt said roll with a snap action to a corrective one of said predetermined limiting positions immediately upon energization by said sensing means and to retain said roll fixed in said one position during the continuance of said deviation, and said biasing means being constructed and arranged to return said roll with a snap action immediately to the normal transverse position upon de-energization of said actuators by discontinuance of said deviation.

11. Sheet guiding apparatus comprising at least one roll arranged to engage a traveling sheet of material transversely to the direction of travel;
  detection means including a sensor arranged in a fixed position along the path of movement of the traveling sheet and sensitive to any lateral deviation of said sheet from a predetermined path to produce an error detection signal, and transducer means for translating said error detection signal into separate control signals one indicative of the sense of a deviation in excess of a predetermined permissable tolerance limit in either lateral direction;
  means supporting said roll for limited tilting movement from a normal transverse position with respect to the direction of travel of said sheet to either of two predetermined limiting positions of opposite angular sense, to induce a tendency in the sheet to correct its path of movement;
  a pair of actuators one drivingly connected with either end of said roll for inducing tilting movement thereof between said normal position and either of said limting positions, and connected with said transducer means for independent energization each by one of said control signals without reference to the magnitude of the signalled deviation;
  means biasing each end of said roll toward said normal position for returning said roll immediately thereto upon de-energization of said actuators;
  each of said actuators being constructed and arranged to tilt said roll with a snap action to a corrective one of said predetermined limiting positions immediately upon energization by a control signal and to retain said roll fixed in said one position during the continuance of said signal, and said biasing means being constructed and arranged to return said roll immediately with a snap action to the normal transverse position upon de-energization by discontinuance of said signal.

References Cited

UNITED STATES PATENTS

| 2,914,957 | 12/1959 | Johnson | 226—23 X |
| 3,043,153 | 7/1962 | Hindle et al. | 226—21 X |

FOREIGN PATENTS 834,014  5/1960  Great Britain.

ALLEN N. KNOWLES, *Primary Examiner.*